Patented Feb. 9, 1932

1,844,039

UNITED STATES PATENT OFFICE

KARL KRAUSS, OF FRANKFORT-ON-THE-MAIN-FECHENHEIM, AND ALFRED HAGENBÖCKER, OF FRANKFORT-ON-THE-MAIN-HOECHST, GERMANY, ASSIGNORS TO GENERAL ANILINE WORKS, INC., OF NEW YORK, N. Y., A CORPORATION OF DELAWARE

NEW STABLE REDUCTION COMPOUNDS OF THE 6.6'-DIALKOXY-THIOINDIGOS

No Drawing. Application filed April 4, 1930, Serial No. 441,722, and in Germany April 15, 1929.

The present invention relates to the new stable reduction compounds of the 6.6'-dialkoxy-thioindigos.

The new compounds are obtainable by reacting a 6.6'-dialkoxy-thioindigo of the formula:

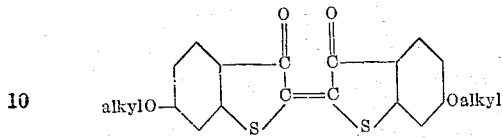

with an alkali and a reducing agent at an elevated temperature and thereupon treating the reduction mass with an acid until it shows an acid reaction against litmus.

A specific mode of carrying out our process which has proved to yield good results is described in the example hereafter following.

Our new reduction compounds are stable to air and oxygen and only difficultly soluble in alkali, which facts prove that they are different from the leuco compounds of the 6.6'-dialkoxy-thioindigos which, as is well known, are easily soluble in alkali and are reconverted by air into the dyestuff proper. They are capable of yielding prints in the same way as do the dyestuffs themselves but with our new stable products prints are also obtainable when employing considerably smaller quantities of the reducing agent as are necessary with the dyestuffs proper which fact proves that our new stable products are reduction compounds of the dyestuffs.

The following example serves to illustrate the invention but it is not intended to limit it thereto, the parts being by weight:

1 kilo of 6.6'-diethoxythioindigo of the formula:

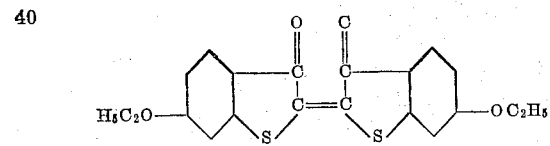

1000 g. of caustic soda solution of 40° Bé. and 50 liters of water are stirred into a paste and heated up to 70°–75° C. After addition of 700–1000 g. of sodium hydrosulfite stirring is continued for some time and sulfurous acid is introduced until the reaction mass shows an acid reaction against litmus. The reduction product which separates is insoluble in aqueous alkali.

The same result can be obtained by introducing instead of sulfurous acid carbonic acid until the mass shows a bicarbonate alkaline reaction.

We claim:

1. As new compounds the stable reduction products of the 6.6'-dialkoxy-thioindigos, the said products being stable to air and oxygen, being difficultly soluble in alkali, yielding prints in the usual way but also with considerably smaller quantities of the reducing agent as are required in the case of the dyestuffs proper.

2. As a new compound the stable reduction product of 6.6'-diethoxy-thioindigo, the said product being stable to air and oxygen, being difficultly soluble in alkali, yielding prints in the usual way but also with considerably smaller quantities of the reducing agent as are required in the case of the dyestuff proper.

In testimony whereof, we affix our signatures.

KARL KRAUSS.
ALFRED HAGENBÖCKER.